R. C. PIERCE.
CONTROL MEANS FOR ELECTRIC SWITCHES.
APPLICATION FILED NOV. 26, 1912.
1,062,728.
Patented May 27, 1913.
2 SHEETS—SHEET 1.
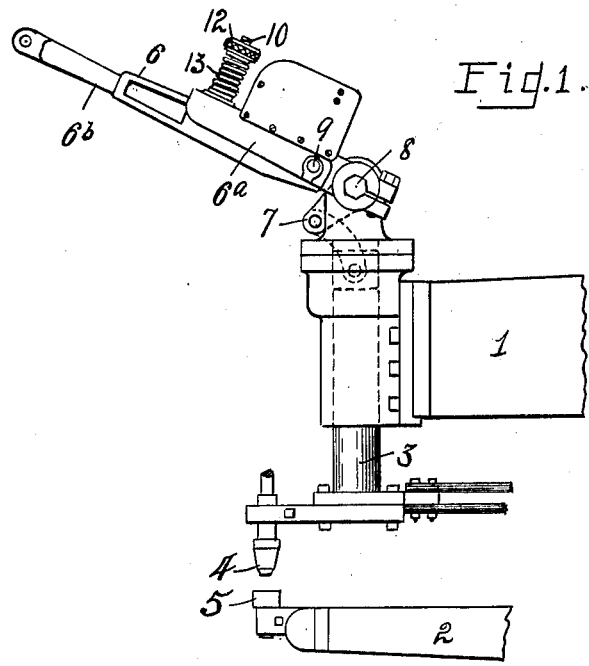
Fig. 1.
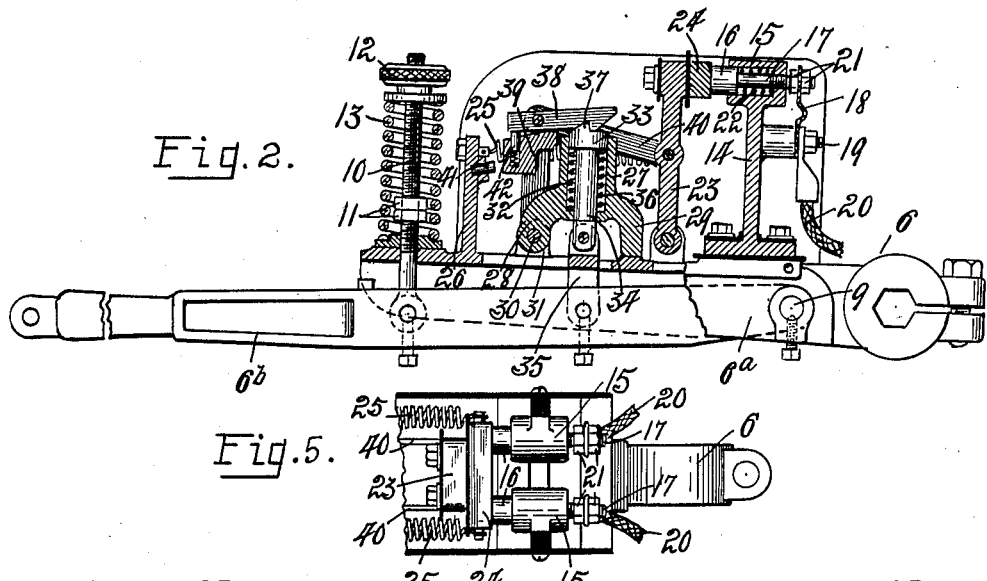
Fig. 2.
Fig. 5.
WITNESSES:
D. C. Watter
C. H. Bills
INVENTOR.
Robert Clark Pierce,
By Owen & Owen,
His attys.

R. C. PIERCE.
CONTROL MEANS FOR ELECTRIC SWITCHES.
APPLICATION FILED NOV. 26, 1912.

1,062,728.

Patented May 27, 1913.

2 SHEETS—SHEET 2.

WITNESSES:
D. C. Walter
C. H. Bills

INVENTOR.
Robert Clark Pierce
By Owen & Owen,
His attys.

UNITED STATES PATENT OFFICE.

ROBERT CLARK PIERCE, OF CINCINNATI, OHIO, ASSIGNOR TO THE TOLEDO ELECTRIC WELDER COMPANY, OF CINCINNATI, OHIO, A CORPORATION OF OHIO.

CONTROL MEANS FOR ELECTRIC SWITCHES.

1,062,728. Specification of Letters Patent. Patented May 27, 1913.

Application filed November 26, 1912. Serial No. 733,590.

*To all whom it may concern:*

Be it known that I, ROBERT CLARK PIERCE, a citizen of the United States, and a resident of Cincinnati, in the county of Hamilton and State of Ohio, have invented a certain new and useful Control Means for Electric Switches; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to electric switches, and particularly to switches of that class adapted for use in connection with electric welding machines, but is not restricted to such use as it may be used in any connection for which it may be adapted or appropriated.

The primary object of my invention is the provision, in combination with the control means for the movable die of an electric welding machine, of an electric switch mechanism which is closed upon the application of a predetermined pressure between the dies and work and is automatically opened upon the increasing of such pressure a predetermined extent, thus enabling the welding pressure of the dies upon the work to be controlled to a nicety, which feature is of very great importance in the practical welding of certain materials.

Further objects and advantages of the invention will be apparent from the following detailed description.

The invention is fully described in the following specification, and while, in its broader aspect, it is capable of embodiment in numerous forms, a preferred embodiment thereof is illustrated in the accompanying drawings, in which,—

Figure 3:
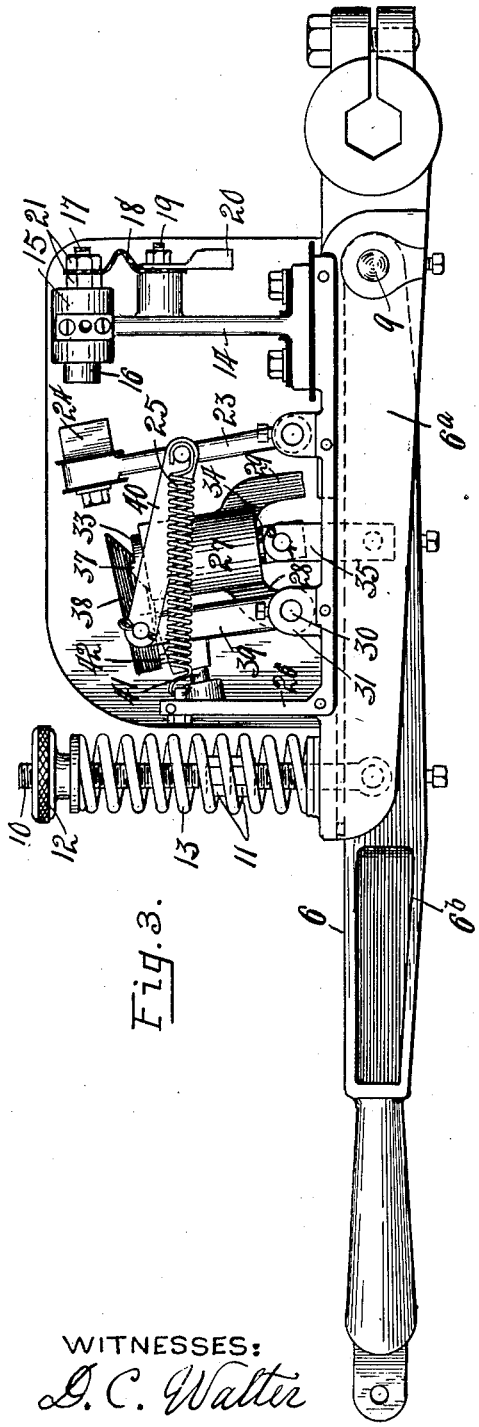
Figure 4:
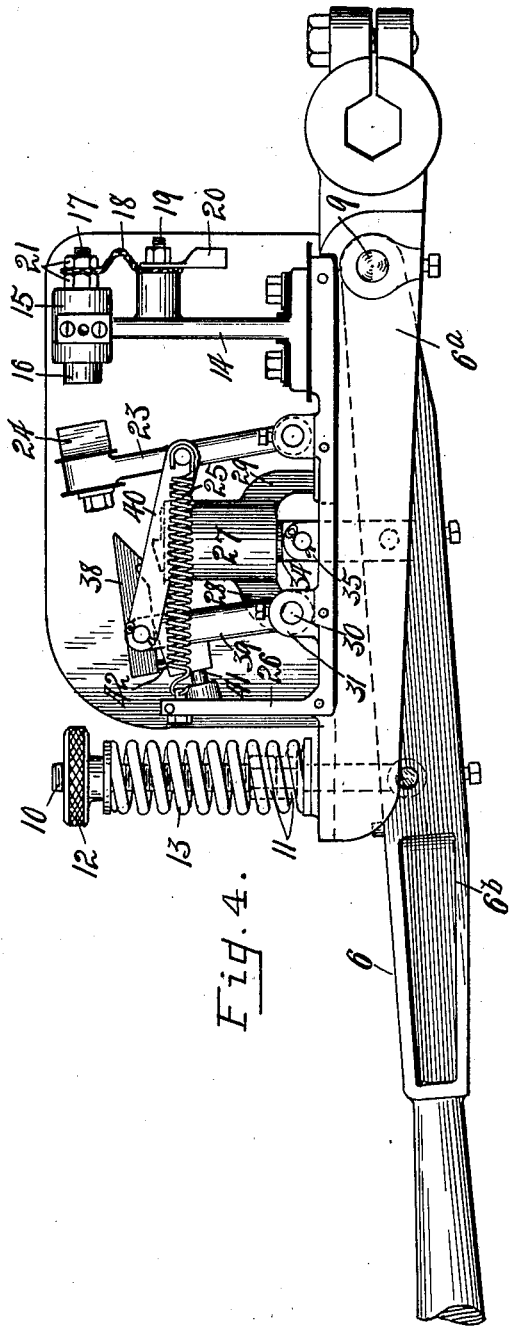

Figure 1 is a fragmentary view of an electric welding machine equipped with my invention. Fig. 2 is a partial sectional view of the switch and lever on which it is mounted, with the parts in current closing or welding positions. Fig. 3 is an enlarged side elevation thereof with the parts in their normal positions. Fig. 4 is a similar view with the parts in the positions which they have after an automatic opening of the switch parts and before the full pressure on the lever has been released, and Fig. 5 is a top plan view of the switch or contact parts in closed position.

Referring to the drawings, 1 and 2 designate the upper and lower horns, respectively, of an electric welding machine, the upper one of which is provided in the present case with a vertically movable plunger 3, to which the movable or upper die 4 of the set is attached, while the lower one of the horns carries the customary lower or fixed die 5. The movements of the plunger 3 are controlled, in the present instance, by a lever 6, which is fulcrumed to the horn 1 above the plunger and has a toggle connection 7 with the latter, as is well understood in the art. It will be understood that the lever 6 can be controlled by hand or connected to and operated by a foot-pedal, as is very frequently done, or may itself constitute a foot-pedal, as the control or manner of operating the lever and its connection with the movable die of the set has nothing to do with the automatic switch features comprising the invention.

The lever 6 is composed of two sections $6^a$ and $6^b$, with the former projecting from the fulcrum point of the lever, or, as in the present case, from the shaft 8 to which the toggle connection 7 is attached, and with the latter projecting at its inner end alongside of the section $6^a$ in the longitudinal plane thereof and pivoting thereto, as at 9. The section $6^a$ is shown as having one side thereof channeled for a portion of its length for the lapping end portion of the section $6^b$ to fit into.

A bolt or threaded stem 10 pivotally projects laterally from the section $6^b$ through a registering opening in the outer or free end portion of the section $6^a$, and carries an adjustable stop-nut 11 at the outer side of the section $6^a$ to serve to limit the relative pivotal or outward movements of the two sections. Two nuts 11 are preferably provided to enable one to serve as a lock nut for the other. A hand or tension-nut 12 is adjustably mounted on the stem 10 without the nuts 11, and interposed between this and the adjacent side of the section $6^a$ is a coiled compression-spring 13, which yieldingly resists a relative opening or outward pivotal movement of the lever sections.

Rising, in the present instance, from the top side of the lever section $6^a$ are two laterally spaced standards or posts 14, each of which is suitably insulated from the lever and terminates at its upper or free end in a socketed head 15. A plunger form of contact or terminal block 16 works in the socket of each head (see Fig. 2), with its outer end projecting from the head in the direction of the outer end of the lever, and has a stem 17 projecting inwardly therefrom through the inner or closed end of the socket. A flexible lead or member 18 electrically connects the stem 17 to a fixed binding-post 19 on the associated standard 14, to which a positive or negative lead 20 connects, as the case may be. The flexible leads 18 are clamped to the stems 17 between nuts 21 thereon, and these nuts serve to limit the outward movements of the contacts 16 relative to the respective heads under the influence of coiled compression springs 22 in said heads.

An arm 23 pivotally rises from the top of the lever section 6ª in advance of the standards 14, 14 or between said standards and the stem 10, for swinging movements lengthwise of the lever, and insulatingly carries a contact-block 24 at its upper end in position to be swung into contact with both terminal members 16 to close the electrical connection therebetween and effect a consequent closing of the welding circuit. The block 24 is influenced to normally stand out of contact with the terminal members 16 by the action on the arm 23 of a pair of coiled contraction springs 25, one of which connects each side of the arm 23 intermediate its ends with a standard 26, which rises from the top of the lever 6ª adjacent to the stem 10, as best shown in Figs. 3 and 4.

A chair or frame 27 is disposed over the lever section 6ª between the switch arm 23 and the standard 26, and has supporting legs 28 and 29 projecting from opposite sides thereof lengthwise of the lever with the leg 28, or the one which is adjacent to the standard 26, hingedly connected to the lever section 6ª, as through the medium of a shaft 30 carried by bearings 31 rising from such section, and has its other leg adapted to have contact with the top of the section 6ª to limit the forward swinging movements of said chair. The chair 27 has a vertical upwardly opening socket 32 therein in which a plunger 33 works. The plunger 33 has a stem 34 extended downwardly therefrom through the bottom of the socket and connected with the lever section 6ᵇ through a link 35, thus causing relative movements of the lever sections 6ª and 6ᵇ to communicate reciprocatory movements to the plunger 33 in its socket. A coiled contraction spring 36 is mounted within the socket 32 between its base and the plunger 33 to influence an outward movement of the plunger relative to the socket. This spring also coöperates with the spring 13 in yieldingly resisting a relative outward or opening movement of the lever sections.

The outer end of the plunger 33 is formed with a tooth 37 that is disposed transversely of the lever and is normally engaged by the toothed end of a pawl or catch member 38, which is pivotally carried at the upper end of a yoke member 39, which pivotally rises from the shaft 30 to permit it to have swinging movements relative to the lever section 6ª on an axis which is preferably common to the swinging axis of the chair 27. When the tooth 37 and catch 38 are engaged the chair 27 and yoke 39 are prevented from having relative outward swinging movements. The tooth and catch are provided with tapered surfaces to adapt them to move into hooked engagement with each other when the chair and yoke are swung toward each other.

The yoke 39 has its upper or swinging end pivotally connected by links 40 to opposite sides of the switch arm 23, whereby said arm and yoke are caused to have swinging movements in unison, so that when the switch arm 23 is in the open or inclined position shown in Figs. 3 and 4 the yoke 39 will stand tilted against a stop 41 on the adjacent side of the standard 26.

When the lever section 6ᵇ is in its released or normal position relative to the lever 6ª the chair 27 stands in the rearwardly tilted or inclined position shown in Fig. 3 with the tooth 37 on its plunger 33 in hooked engagement with the pawl 38, the engagement of such catch members being influenced by the action of the spring 36 on the plunger and the action of a spring pressed detent 42 on the rear or free end of the pawl, said detent being carried by the yoke 39, as best shown in Fig. 2. Upon a relative outward movement of the lever sections, the yielding connection of the section 6ᵇ with the chair 27, through the parts 33, 34, 35 and 36 causes the chair and yoke 39 to swing forward until the chair leg 29 rests upon the lever section 6ª, thus moving the switch part 24 into contact with the switch parts 16, 16 to close the welding circuit. When the lever section 6ᵇ has had a sufficient outward movement relative to the section 6ª to place the parts in the switch closing positions shown in Fig. 2, a continued relative outward movement of the two lever sections will draw the plunger 33 down into the socket 32 of the chair, against the tension of the spring 36, a sufficient distance to release the engagement of the plunger tooth with the catch 38, thus enabling the contractile springs 25 to move the switch arm 23 and attached parts to open position, as indicated in Fig. 4. Upon a release from the lever of the pressure which is holding the two sections thereof in separated position the springs 13 and 36 will act to draw the lever sections toward each other until the plunger 33 has assumed its normal position relative to the chair 27, when the spring 13 will alone act to complete the relative closing movements of the lever sections and to swing the chair 27 and its plunger 33 back into position for the plunger to again engage with the catch 38, as shown in Fig. 3.

In the use of my invention in connection with an electric welding machine, with which it is particularly intended for use, the operator after placing work pieces to be welded between the dies 4 and 5 exerts a downward pressure on the section 6$^b$ of the lever to lower the movable die into contact with the work, the tension of the spring 13 being sufficient to prevent a relative movement of the lever sections during such movement of the movable die into contact with the work. Upon a continued exertion of pressure upon the lever, after the dies have been moved into contact, the spring 13 will yield to permit a relative outward movement of the lever sections 6$^a$, 6$^b$ and a consequent drawing of the chair 27 and attached parts from the positions shown in Fig. 3 to the positions shown in Fig. 2, with the front leg 29 of the chair resting firmly on the lever section 6$^a$ and with the switch part 24 in circuit closing contact with the terminals 16. When the switch is closed a further pressure upon the lever is resisted by the spring 36 in addition to the spring 13, and the operator distinctly feels the increased pressure occasioned on the lever by the spring 36. The lever is then held in this position until the stock is heated to the desired extent to effect an efficient welding of the work pieces, when the operator applies an additional pressure on the lever to effect a further separation of the lever sections to an extent sufficient to retract the plunger 33 into the chair socket and effect a tripping of the engagement of said plunger with the catch 38. Upon a release of the engagement of the catch 38 with the plunger the springs 25 swing the arm 23 and yoke 39 to the rear to effect a breaking of the contact between the switch part 24 and terminals 16, thus opening the welding circuit. This having been done the operator releases the pressure on the lever 6 to permit its return to raised or normal position.

It is evident with this form of switch that the pressure of the dies on the work, until the switch is closed, is entirely dependent upon the tension of the spring 13, thus making it necessary to exert a predetermined pressure on the work between the die points before the closing of the switch so that uniform welding results are obtained for successive welding operations for all work of any particular thickness or material. It is also evident that upon the exertion of an increased pressure upon the control lever 6 the parts 37 and 38 will be automatically tripped to permit an opening of the switch, thus preventing the exertion of too great a pressure upon the work by the dies while the welding circuit is closed. It is also evident that the stop nuts 11 on the stem 10 may be adjusted to limit the relative outward movements of the lever sections before the parts 37 and 38 have been tripped so that pressure may be exerted on the lever without opening the switch, in which case the switch is not opened until the operator releases the lever.

It is preferable to yieldingly mount the two terminals or contact members 16, 16 in their respective carrying heads to compensate for wear occurring between the contacting surfaces of said terminals and the movable switch part 24, the normal projection of the terminal parts 16, 16 from the heads being such as to permit the part 24 to make contact therewith before it has reached the full limit of its forward or circuit closing movement.

I wish it understood that my invention is not limited to any specific construction, arrangement or form of the parts except in so far as such limitations are specified in the claims.

Having thus described my invention, what I claim as new, and desire to secure by Letters Patent, is,—

1. In combination, a plurality of members mounted for relative and unitary movements, means yieldingly resisting a relative movement of said members from normal position, a switch carried by one of said members and having a movable part, means acting on said part to normally maintain it in open position, mechanism movably carried by one and connected to the other of said members and to said switch part and operable by a relative movement of the members from normal position to move said part to switch closing position.

2. In combination, a movable member having relatively movable parts, means for resisting a relative outward movement of said parts and adjustable to vary such resistance, an electric switch carried by one of said parts and having a movable element, means influencing an opening movement of said element, and mechanism pivotally carried by the switch carrying part and having connection with both said element and the other of said parts, said mechanism being operable upon a relative outward movement of the parts to move said element to switch closing position.

3. In combination, a movable member having pivotally connected relatively movable parts, means yieldingly resisting a relative outward movement of said parts and adjustable to vary such resistance, an electric switch carried by one of said parts and having a pivotally movable element, means influencing an opening movement of said element, and mechanism carried by the switch carrying part for rocking movements in unison with said element and having connection with the other of said parts and operable by relative outward movements of the parts to move said element to switch closing position.

4. In combination, a lever having a relatively movable part, an electric switch having a movable element, and means operable by a movement of said part relative to the lever for moving said element to close the switch and to permit an automatic opening movement of said element at a predetermined point in the relative movements of said part and lever.

5. In combination, a lever having a relatively movable part, means for resisting relative movements in one direction of said lever and part, a normally open electric switch, and mechanism operable by a relative movement of said lever and part to effect a closing of the switch and to permit an automatic opening of the switch upon a continuation of such relative movements of the lever and part.

6. In combination, a lever having a plurality of relatively movable parts, means yieldingly retaining said parts in one position of their relative movements, a normally open electric switch carried by one of said parts, and mechanism automatically operable to close said switch upon the application of a predetermined pressure on one of said lever parts and to permit an opening of the switch upon the application of a greater predetermined pressure on such part.

7. In combination, a lever having a plurality of pivotally connected parts which are relatively movable in the plane of movement of the lever, means yieldingly resisting a relative movement of the parts from normal position and adjustable to vary such resistance, an electric switch having a movable element which is normally in open position, and mechanism carried by one of said parts and connecting said element and the other of said parts, said mechanism being operable to move said element to switch closing position and to release the element to permit its return to open position at different predetermined points in a relative movement of said parts from normal position.

8. In combination, a lever having relatively movable parts, one extending beyond the other with the outer part influenced to normally stand in one position relative to the other part, a normally open electric switch carried by one of said parts, and mechanism connecting said switch and the other of said parts and operable by a relative movement of the parts from normal position to close the switch and then to release the switch to permit an opening thereof upon the application of an increasing operating pressure on the lever.

9. In combination, a mutiple part lever, means for resisting a relative movement of said parts in one direction, a normally open electric switch, mechanism carried by one and connected to the other of said parts and operable to effect a closing of the switch upon a predetermined relative movement of the parts from normal position and embodying trip means which at a predetermined point in a continued movement of the parts from normal position automatically releases the switch to permit it to open.

10. In combination, a lever having longitudinally-extending pivotally-connected parts, means resisting a relative movement of said parts in one direction, an electric switch carried by one of said parts and having a movable element, means influencing an opening movement of said element, and catch mechanism connecting said movable element and operated by a relative movement of said parts from normal position to close the switch upon the application of a predetermined operating pressure on the lever and to automatically trip to permit an opening of the switch upon the application of a greater predetermined pressure on the lever.

11. In combination, a lever having pivotally connected parts which are relatively movable in one direction of rocking movements of the lever, an electric switch carried by one of said parts and having a normally open movable circuit closing element, adjustable means for yieldingly retaining one part in normal position relative to the other, catch mechanism carried by one of said parts and normally connecting said switch element and the other of said parts and operable to move said element to close the switch upon a predetermined relative movement of said switch parts from normal position and adapted to release said element to permit it to open upon a further predetermined relative movement of the lever parts from normal position.

12. In combination, a lever having hingedly connected sections, yielding means normally retaining said sections in one position of their relative movements, an electric switch carried by one section and having a movable switch-opening and closing element which is influenced to normally stand in open position, and mechanism attached to said element and coöperating with said sections to move the element to switch closing position upon a relative movement of said sections from normal position and to automatically release said element to permit it to move to open position upon a further relative movement of said sections from normal position.

13. In combination, a lever arm having pivotally connected parts, means yieldingly resisting a movement of one part in one direction relative to the other part, an electric switch having relatively movable circuit breaking and closing elements, means influencing an opening of said elements, and mechanism coöperating with said lever parts to effect a closing of the switch elements upon a predetermined relative movement of said parts from normal position and operable to release the switch to permit an opening thereof when the lever parts have been relatively moved a further predetermined distance from normal position.

14. In combination, a lever having an arm thereof composed of a plurality of hingedly connected members, means yieldingly resisting a relative movement of said members in one direction, an electric switch carried by one of said members and having a movable contact part influenced to normally stand in open position, means carried by one and connected to the other of said members and being movable relative to its carrying member by a relative movement of said members from normal position, mechanism in catch engagement with said latter means and having connection with said contact part whereby it is movable therewith, said mechanism and coacting means being operable in unison to move the contact part to circuit closing position when said members are relatively moved a predetermined extent from normal position and being automatically released to permit a circuit breaking movement of the contact part upon a further predetermined relative movement of said members from normal position.

15. In combination, a lever having hingedly connected inner and outer members, an electric switch carried by the inner member and having a normally open contact part, a catch element connected to and movable with said contact part, a second catch element normally movable with said first element and connected to said outer member, said elements being normally engaged and operable to move the contact part to circuit closing position upon a predetermined relative movement of the lever members and being operable to release their catch engagement to permit an opening movement of the contact part upon a further predetermined relative movement of said members.

16. In combination, a lever having inner and outer pivotally connected relatively movable members, means resisting an outward movement of one member relative to the other, an electric switch having a movable contact part which is influenced to normally stand in open position, a catch element carried by one of said members and connected with said contact part and movable therewith, a second catch element normally engaged to said first catch element and movable therewith, said second element having connection with the other of said members and being movable by a relative movement of the lever members from normal position to move the contact part to circuit closing position and adapted to release the first catch element upon a further predetermined relative movement of the lever members to permit an opening movement of the contact part, said second catch element being provided with means for acting in conjunction with said yielding means to resist a relative outward movement of the lever members when the switch is closed.

17. In combination, a lever having yieldingly connected relatively movable parts, a normally open switch, and mechanism operable to close said switch when a predetermined pressure is exerted on the lever through one of said parts and to act to permit an opening of the switch upon the application of a greater predetermined pressure on such part.

18. In combination, a control lever having yieldingly connected relatively movable parts, a normally open switch carried by one of said parts, and mechanism connecting said switch and both of said parts and operable to effect a closing of the switch upon the application of a predetermined operating force on the lever through one of said parts and operable to disconnect the switch and lever part to which the pressure is applied to permit an opening of the switch upon the application of a greater predetermined pressure to said part.

19. In combination, a control lever having yieldingly connected relatively movable parts, a normally open switch carried by one of said parts, and mechanism connecting both of said parts and normally in connection with said switch, said mechanism being movable by a relative movement of the parts in one direction to effect a closing of the switch and being automatically operable to release the switch to permit an opening thereof upon a greater predetermined relative movement of said parts, said mechanism having means for requiring the application of a greater operating pressure on the lever to release said switch than is required to close the switch.

20. In combination, a control lever having yieldingly connected parts which are relatively movable in the direction of applied operating pressure, an electric switch carried by one of said parts, and mechanism connected with said switch and operable to successively close and open the switch upon the application of an increasing operating pressure on one of said lever parts.

21. In combination, a control lever having yieldingly connected parts capable of relative movements in the direction of an applied lever operating force, a normally open electric switch carried by one of said parts, and mechanism normally connected with said switch and operable to close and then release it upon the application of an operating pressure on the lever, said mechanism having means which resists a releasing of the connection between the switch and mechanism until a greater pressure is applied to the lever than is required to close the switch.

22. In combination, a lever having yieldingly connected relatively movable parts, a normally open electric switch carried by one of said parts, separate coöperating catch means carried by said switch carrying part for relative rocking movements, one of said means being connected with the switch and the other being connected with the other of said parts, said separate means being normally engaged with each other and movable as a unit by a relative movement of the lever parts from normal position to close the switch and being releasable upon a further relative movement of said parts to permit an opening of the switch.

23. In combination, a switch having yieldingly movable terminal parts and a circuit-closing part for movement into and out of contact with said terminal parts, and mechanism operable to move said circuit closing parts into circuit closing position and to automatically break contact between such parts upon the application of a predetermined operating force on said mechanism.

24. In combination, an electric switch having a normally open movable circuit-closing member, and mechanism operable by the application of an increasing pressure on a part thereof to move said member to circuit closing position and then to release it to permit an opening of the circuit.

25. In combination, an electric switch having a normally open circuit-closing member, mechanism operable upon the application of an increasing pressure in one direction on a part thereof to move said member to circuit closing position and then to release it, and means for yieldingly resisting a member moving operation of said mechanism.

26. In combination, a switch having a movable circuit-closing member, means influencing an opening movement of said member, a lever part, catch means connecting said part and member and operable upon the application of an increasing pressure in one direction on said part to move said member to circuit closing position and then to release it, and adjustable means for yieldingly resisting a member closing movement of said part.

27. In combination, a switch having a movable circuit closing member, means influencing an opening movement of said member, a lever part, catch means connecting said part and member and comprising relatively rocking catch parts having a common rocking axis, said catch parts being normally engaged and operable upon the application of a predetermined pressure in one direction on said part to move said member to circuit closing position and upon the application of a greater pressure on said part to release the catch parts to permit an opening movement of said member.

28. In combination, a member, a normally open electric switch, a lever part fulcrumed to said member for yielding movements relative thereto, an element pivoted to said m m- ber for limited rocking movements relative thereto, a catch member carried for yielding movements by said element and having connection with said lever part, a catch member pivotally carried by said first member and adapted to engage said first catch member to have rocking movements therewith, said catch members and element coöperating, upon the application of pressure in one direction on said lever part, to close said switch, and, upon the application of a greater pressure to said lever part, to effect a release of said catch parts to permit an opening of the switch.

29. In an electric welding machine, the combination of a set of relatively movable welding dies, an electric switch in circuit with said dies, means operable to apply pressure between said dies, and mechanism automatically operable by the application of pressure on said means to close said switch upon the application of one pressure and to open the same upon the application of a different pressure between the dies.

30. In an electric welding machine, a set of relatively movable dies, an electric switch in circuit with said dies, a control lever for the movable die, and mechanism automatically operable to close the switch upon the application of a predetermined operating force on the lever and to open the switch upon the application of an increased operating pressure on the lever.

31. In an electric welding machine, a set of relatively movable welding dies, a normally open switch in circuit with said dies, a lever for controlling the relative movement of said dies, mechanism operable to close said switch upon the application of a predetermined operating pressure on said lever and to release the switch to permit an opening thereof upon the application of a greater predetermined operating pressure on said lever, and means adjustable to regulate the pressure at which said mechanism will operate to close the switch.

32. In an electric welding machine, a normally open electric switch relatively movable welding dies in circuit with the switch and mechanism operable to relatively move the dies to exert pressure therebetween and to automatically close the switch upon the exertion of a predetermined pressure between the dies and to permit an opening of the switch upon the exertion of a different predetermined pressure between the dies.

33. In an electric welding machine, a set of relatively movable dies in a common electric welding circuit, and mechanism operable to relatively move the dies to exert pressure therebetween and to automatically close the electric welding circuit upon the application of a predetermined pressure between the dies and to automatically open said circuit upon the application of a different predetermined pressure between the dies.

In testimony whereof, I have hereunto signed my name to this specification in the presence of two subscribing witnesses.

ROBERT CLARK PIERCE.

Witnesses:
 NAT. MACNEALE,
 ALBERT WILLIAMSON.